G. W. PERRY.
TRACTION ENGINE.
APPLICATION FILED JULY 29, 1912.. RENEWED FEB. 25, 1914.
1,100,148.
Patented June 16, 1914.
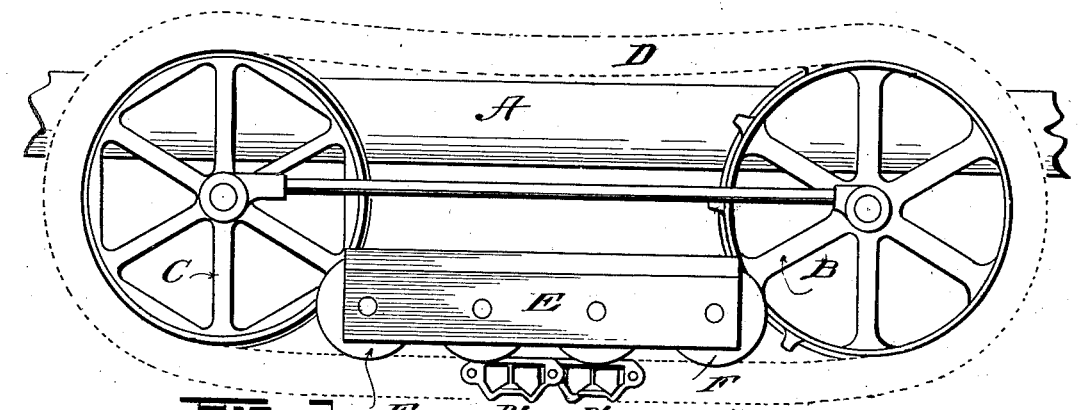
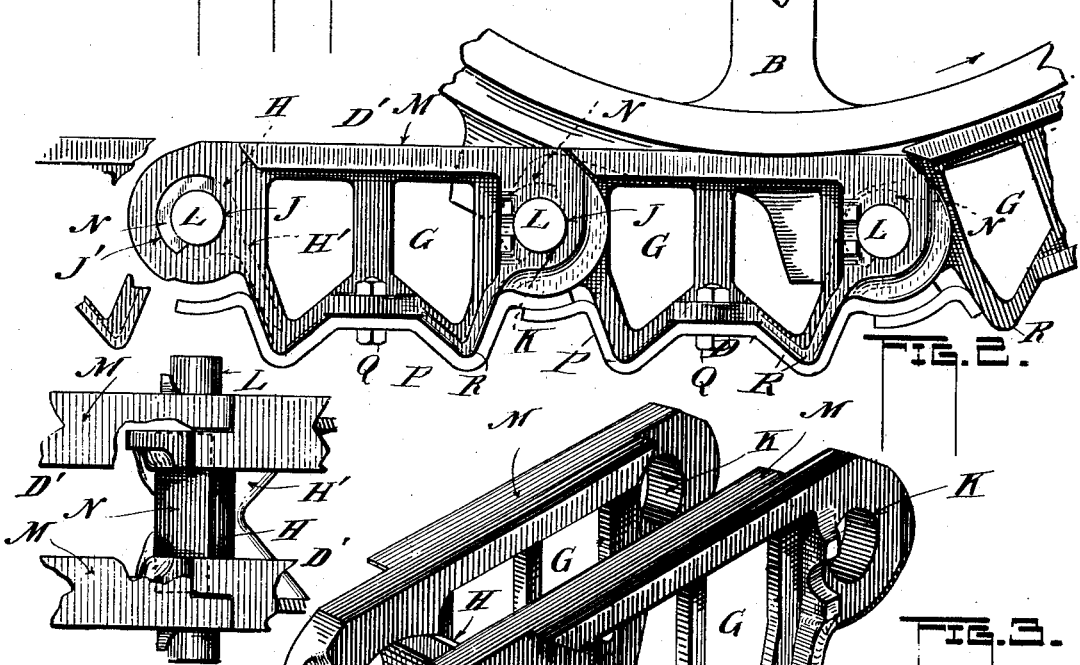
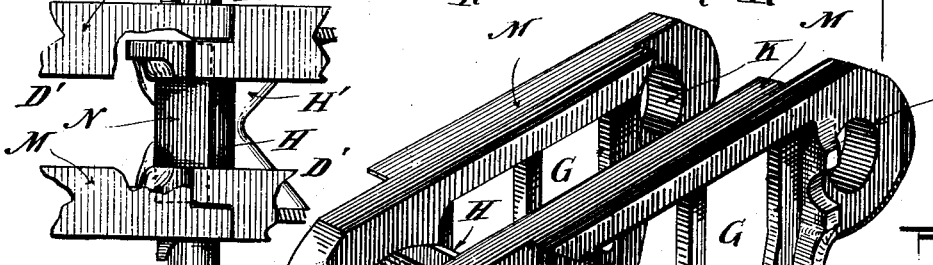
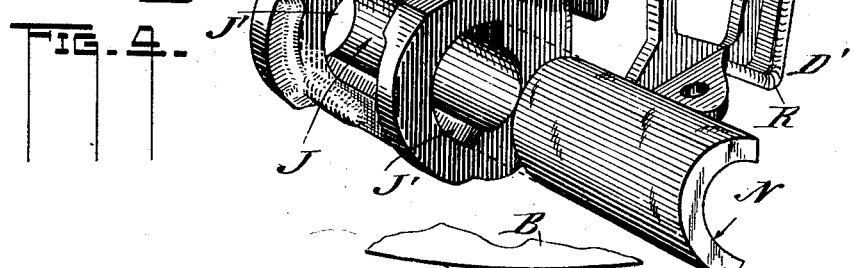
Witnesses:
Charles Pickles
R. S. Berry
Inventor:
George W. Perry,
By C. H. Strong,
Atty.

UNITED STATES PATENT OFFICE.

GEORGE W. PERRY, OF PEORIA, ILLINOIS, ASSIGNOR TO HOLT CATERPILLAR CO., OF PEORIA, ILLINOIS, A CORPORATION OF CALIFORNIA.

TRACTION-ENGINE.

1,100,148.  Specification of Letters Patent.  Patented June 16, 1914.

Application filed July 29, 1912, Serial No. 712,018. Renewed February 25, 1914. Serial No. 821,045.

*To all whom it may concern:*

Be it known that I, GEORGE W. PERRY, citizen of the United States, residing at Peoria, in the county of Peoria and State of Illinois, have invented new and useful Improvements in Traction-Engines, of which the following is a specification.

This invention relates to traction engines having a self-laying track, commonly known as caterpillar engines.

The present invention relates particularly to the traction belt therefor.

The invention consists of the parts and the combination and construction of parts as hereinafter more fully described and claimed, having reference to the accompanying drawings, in which—

Figure 1 is a side elevation showing the application of the invention. Fig. 2 is a side elevation showing particularly the link section. Fig. 3 is a perspective of a link with its removable bushing. Fig. 4 is a fragmentary plan view of two inter-engaging links. Fig. 5 is a side elevation of the tooth of a sprocket wheel showing an inserted, hardened face portion.

A indicates a portion of an engine frame which carries the rear driving sprocket B, and the front idle companion wheel C.

D represents the traction belt having the link sections D' supporting the truck E, having wheels F. The principal weight of the engine is carried by the truck E running on its endless track.

Power is applied by means not necessary here to be shown, to the rear sprocket wheel or wheels B, which continually picks up the track and carries it forward in the direction of the arrow Fig. 1, over the supporting front wheel C to be continually laid on the ground for the truck E to move over. The principal feature of the present invention resides in the peculiar construction of the link sections D'. Each link is composed of two side or web portions having the openings G for the purpose of allowing for the expulsion of accumulations of dirt and other detritus, which would otherwise operate seriously against the successful use of the machine. The web portions are connected across one end so as to form a solid one-piece link by means of the semi-cylindrical barrel H, Fig. 3. This barrel is provided with a strengthening web H', Fig. 4. The open portion of the barrel faces that end of the link adjacent to the bearing contact of the teeth of sprocket wheel B, and this open portion indicated at J', is of sufficiently greater diameter than the bore J of the barrel to receive a removable semi-cylindrical manganese steel bushing N. The concavity of the bushing N is on the same radius as and designed to be in continuation of the concavity J of the barrel, and to form a continuous bore for the receipt of the link pin L; the link pin L being supported in the perforations K of the widened end of the adjacent link. The barrel H is arranged at the narrow end of the link; this narrow portion being so shaped as to fit the correspondingly widened end of a succeeding link; the hole for the pin L being offset upon the side against which pressure and wear are brought and the segmental wearing plate fitted to the offset removable lengthwise therefrom, and taking both the wear of the pin L and the wear on the sprocket teeth of wheel B.

P represent traction shoes consisting of steel plates with overlapping ends secured to the links D' by suitable means as the bolts or rivets Q; these plates P being preferably corrugated to accommodate the angular projections R of the links. The opposed edges of the links have track or rail-head portions M forming a continuous track for rollers F of the trucks E to run upon.

O is a removable wearing surface dovetailed, or otherwise suitably secured to one or both sides of the teeth of sprocket B and coöperating with the hardened bushing N to increase the life of the machine.

Having thus described my invention what I claim and desire to secure by Letters Patent is—

1. In a traction engine the combination in an endless tread belt therefor of a series of links consisting of side-web portions integrally connected by a semi-cylindrical barrel at their narrowed ends, said webs having integrally formed rail-heads along one of their longitudinal edges, a shoe plate secured to the opposite edge of the same, said webs being open on their sides, and a semi-cylindrical bushing in complementary position to the semi-cylindrical barrel.

2. A link for an endless tread belt for traction engines, consisting of a pair of web-portions integrally connected at one end by a semi-cylindrical barrel, a semi-cylindrical hardened bushing positioned in complementary relation to the barrel and completing therewith a bore for the pivot pin, said bushing forming a wearing surface on its inside for the pivot pin and having an outside wearing surface to receive the wear of the teeth of the sprocket around which the belt may pass, said web-portions having integrally formed rail-heads, substantially as described.

3. In a traction engine, the combination of front and rear sprockets, a tread belt passing around the sprockets, said tread belt comprising a series of conjoined links, each of which is provided with a track shoe, each link consisting of a pair of web members integrally connected at one end by a semi-cylindrical barrel, the open portion of said barrel opening toward the immediately adjacent contiguous link, a segmental hardened bushing in said open space and removable lengthwise therefrom and coöperating with the semi-cylindrical barrel to provide a bore for a pivot pin, a pivot pin passing through said bore and secured in the widened end of the companion link, said links having overlapping rail-heads forming a continuous track for the engine truck to run on, and a truck connected with the engine frame and running on said rail-heads.

4. In a traction engine, the combination of front and rear sprockets of a tread belt passing around the sprockets, said tread belt comprising a series of conjoined links, each of which is provided with a track shoe, each link consisting of a pair of web members integrally connected at one end by a semi-cylindrical barrel, the open portion of said barrel opening toward the immediately adjacent contiguous link, a segmental hardened bushing in said open space and removable lengthwise therefrom and coöperating with the semi-cylindrical barrel to provide a bore for a pivot pin, a pivot pin passing through said bore and secured in the widened end of the companion link, said links having overlapping rail-heads forming a continuous track for the engine truck to run on, and a truck connected with the engine frame and running on said rail-heads, the webs of said link sections having openings for the expulsion of any detritus tending to collect between the rail-heads, the sprocket teeth coöperating as ejectors to exclude said detritus, and the sprocket teeth having removable, hardened wearing shims in contact with said hardened bushings.

In testimony whereof I have hereunto set my hand in the presence of two subscribing witnesses.

GEORGE W. PERRY.

Witnesses:
  G. F. DICKENSON,
  M. M. BAKER.